US009601871B2

(12) United States Patent
Schmidt et al.

(10) Patent No.: US 9,601,871 B2
(45) Date of Patent: Mar. 21, 2017

(54) LOCKING DEVICE FOR A PLUG-IN CONNECTOR HOUSING

(75) Inventors: Martin Schmidt, Luebbecke (DE); Nicole Spilker, Luebbecke (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 223 days.

(21) Appl. No.: 13/879,108

(22) PCT Filed: Jun. 20, 2011

(86) PCT No.: PCT/DE2011/075138
§ 371 (c)(1),
(2), (4) Date: Apr. 12, 2013

(87) PCT Pub. No.: WO2012/052008
PCT Pub. Date: Apr. 26, 2012

(65) Prior Publication Data
US 2013/0203279 A1    Aug. 8, 2013

(30) Foreign Application Priority Data

Oct. 19, 2010    (DE) .......................... 10 2010 038 266

(51) Int. Cl.
*H01R 13/627*    (2006.01)
*H01R 13/639*    (2006.01)
*H02G 3/08*    (2006.01)

(52) U.S. Cl.
CPC ....... *H01R 13/639* (2013.01); *H01R 13/6275* (2013.01); *H02G 3/081* (2013.01)

(58) Field of Classification Search
CPC ............. H01R 13/639; H01R 13/6392; H01R 13/6275; H01R 13/627; H01R 13/6271; H01R 13/6273; E05C 19/06; E05C 19/063; E05C 19/10; H02G 3/081
USPC ....... 439/352, 358, 350, 155, 160, 752, 345; 292/19, 20, 70, 71, 76, 80, 81, 83, 86–91, 292/107, 256, 256.63, 256.6, 256.5, 292/256.65, 256.67, 256.71, 257, 299,
(Continued)

(56) References Cited

U.S. PATENT DOCUMENTS 1,015,907 A * 1/1912 Ryder .......................... 220/246
2,108,145 A * 2/1938 Short ........................... 220/246
(Continued)

FOREIGN PATENT DOCUMENTS

DE    429252    3/1993
DE    68913839    10/1994
(Continued)

OTHER PUBLICATIONS

Computer Generated Translation for JP 2004200133, translation performed on Feb. 23, 2016, http://worldwide.espacenet.com.*

*Primary Examiner* — Alyson M Merlino
(74) *Attorney, Agent, or Firm* — Jacobson Holman, PLLC.

(57) ABSTRACT

The invention concerns a locking device for a multi-part plug connector housing (1) comprising a housing upper portion (20) and a housing lower portion (10) fitting thereto, wherein the housing upper portion (20) and the housing lower portion (10) can be reversibly mechanically connected together by way of a spring plate (30), wherein the spring plate (30) is arranged in the interior of the housing upper portion (20) and/or of the housing lower portion (10), wherein the spring plate (30) is operatively connected to a single, outwardly disposed actuating knob (40).

5 Claims, 6 Drawing Sheets

(58) Field of Classification Search
USPC ... 292/300, 303, DIG. 37, DIG. 11, DIG. 16, 292/DIG. 27, DIG. 30, DIG. 48; 220/210, 315, 284, 324, 326; 70/63, 70/69–71, 73, 77–79, 81, 158, 360, 432, 70/159–163, 166–173, 208, 361
See application file for complete search history.

(56) References Cited

U.S. PATENT DOCUMENTS

| | | | | |
|---|---|---|---|---|
| 2,735,571 | A * | 2/1956 | Lockwood | 220/246 |
| 2,735,572 | A * | 2/1956 | Getz | 220/246 |
| 3,425,587 | A * | 2/1969 | Duross, Jr. | 220/326 |
| 3,791,045 | A * | 2/1974 | Landis et al. | 292/19 |
| 4,007,516 | A * | 2/1977 | Coules | 411/349 |
| 4,195,867 | A * | 4/1980 | Baillie | 292/174 |
| 4,647,093 | A * | 3/1987 | Palsson | 292/251 |
| 4,779,755 | A * | 10/1988 | Harris | 220/203.21 |
| 4,961,711 | A | 10/1990 | Fujiura et al. | |
| 4,964,659 | A * | 10/1990 | Baldwin | 292/19 |
| 5,413,392 | A * | 5/1995 | Schlack et al. | 292/204 |
| 5,732,580 | A * | 3/1998 | Garnault et al. | 70/422 |
| 5,860,302 | A * | 1/1999 | James | 70/63 |
| 5,882,053 | A * | 3/1999 | Bekins et al. | 292/336.3 |
| 5,893,772 | A * | 4/1999 | Carmo et al. | 439/346 |
| 6,067,827 | A * | 5/2000 | Haseley et al. | 70/370 |
| 6,113,160 | A * | 9/2000 | Johansson et al. | 292/169 |
| 6,116,660 | A * | 9/2000 | Langkamp et al. | 292/65 |
| 6,325,427 | B1 * | 12/2001 | Daoud | 292/27 |
| 6,364,687 | B1 * | 4/2002 | Chen | 439/358 |
| 6,565,388 | B1 | 5/2003 | Van Woensel et al. | |
| 6,575,503 | B1 * | 6/2003 | Johansson et al. | 292/170 |
| 6,918,780 | B1 * | 7/2005 | Yang | 439/346 |
| 7,690,876 | B2 * | 4/2010 | Kawai et al. | 411/45 |
| 7,695,031 | B2 * | 4/2010 | Jackson et al. | 292/169 |
| 2001/0021602 | A1 * | 9/2001 | Zanten | 439/358 |
| 2007/0004265 | A1 * | 1/2007 | Yeh | 439/358 |
| 2007/0270034 | A1 | 11/2007 | Belopolsky et al. | |
| 2008/0105525 | A1 * | 5/2008 | Chen | 200/318.2 |
| 2009/0017669 | A1 * | 1/2009 | Wu | 439/352 |
| 2010/0140964 | A1 | 6/2010 | Schmidt et al. | |
| 2013/0252454 | A1 * | 9/2013 | Zahler et al. | 439/358 |

FOREIGN PATENT DOCUMENTS

| | | | |
|---|---|---|---|
| DE | 102008039787 | 3/2010 | |
| EP | 2194217 | 6/2010 | |
| FR | 765795 | 7/1934 | |
| JP | 2004200133 | 7/2004 | |
| JP | 2010133241 | 6/2010 | |
| WO | WO 2011/069521 | 6/2011 | |
| WO | WO 2011142740 A1 * | 11/2011 | A01M 25/004 |

* cited by examiner

LOCKING DEVICE FOR A PLUG-IN CONNECTOR HOUSING

This is a national stage of PCT/DE11/075138 filed Jun. 20, 2011 and published in German, which has priority of German no. 10 2010 038 266.3 filed Oct. 19, 2010, hereby incorporated by reference.

BACKGROUND OF THE INVENTION

The invention concerns a locking device for a multi-part plug connector housing comprising a housing upper portion and a housing lower portion fitting thereto, wherein the housing upper portion and the housing lower portion can be reversibly mechanically connected together by way of a spring plate, wherein the spring plate is arranged in the interior of the housing upper portion and/or of the housing lower portion.

Such locking devices are required in order for example to latch two plug connector housing portions together in non-losable fashion and to unlatch them again. The locking devices are of such a configuration that the insides of the plug connector housing are protected after locking from environmental influences such as for example liquids and dust.

The insides of a lockable and unlockable plug connector housing can comprise contact elements and/or so-called contact modules as are shown for example in as yet unpublished PCT/EP 2009/008779.

STATE OF THE ART

EP 2 194 217 A1 discloses a releasable locking means for a multi-part plug connector housing. A first housing portion includes on both sides actuating knobs which respectively act on elastic spring elements which are associated with them and which are arranged in the housing interior. The first and second housing portions are locked together by way of openings in the spring plate, which cooperate with inwardly disposed latching hooks on a second housing portion.

A disadvantage with such locking devices is that both actuating knobs have to be operated at the same time to implement locking or unlocking. In addition such a locking system takes up a large amount of space within the plug connector housing. As a result such plug connectors are relatively large and cumbersome.

OBJECT OF THE INVENTION

The object of the invention is to propose a locking system for multi-part plug connector housings, which is compact and at the same time reliable.

That object is attained in that the spring plate is operatively connected to a single, outwardly disposed actuating knob.

Advantageous configurations are recited in the appendant claims.

The locking device shown here is intended for a multi-part plug connector housing. Such a plug connector housing comprises a housing upper portion and a housing lower portion fitting thereto. The housing upper portion has an individual actuating knob operable from the exterior. In addition a spring plate is clamped in the interior of the housing upper portion in such a way as to be captively safeguarded against loss.

The actuating knob is disposed within a circular orifice on the housing upper portion. Upon actuation of the actuating knob it is pushed into the orifice. The force resulting therefrom is transmitted to the spring plate which is clamped in the housing interior.

Accordingly the outwardly disposed actuating knob is operatively connected to the inwardly disposed spring plate. The spring plate mechanically connects the two housing portions together. The housing portions can be locked together and unlocked by way of the force exerted on the spring plate. The mechanical connection between the two housing portions by way of the spring plate is accordingly reversible. The precise mechanism for that purpose is described hereinafter.

At least one latching nose is formed at at least one inside wall of the housing lower portion. In general two latching noses are formed at mutually opposite inside walls of the housing lower portion.

The spring plate includes at least one latching opening which engages over the latching nose or noses of the housing lower portion so that the housing upper portion and the housing lower portion are non-losably connected together. The number of latching openings necessarily corresponds to the number of latching noses.

SUMMARY OF THE INVENTION

The spring plate has a substantially rectangular, frame-shape base structure. Two mutually opposite parallel latching arms are arranged on the base frame of the spring plate, perpendicularly to the plane of the base structure. The two latching arms have the latching opening already mentioned hereinbefore.

When the outwardly disposed actuating knob of the plug connector is pushed in the force resulting therefrom is transmitted to the inwardly disposed spring plate. As a result the latching arms of the spring plate move towards each other in such a way that the latching openings of the latching arms slide over the latching noses of the housing lower portion. The latching opening of the latching arms no longer engage over the latching noses so that the spring plate (or the latching openings thereof) is no longer operatively connected to the latching noses. The housing portions can now be separated from each other.

If the actuating knob is actuated before the housing portions have been fitted together then the housing upper portion can be almost effortlessly fitted on to the associated housing lower portion. After the actuating knob is then released the latching openings of the spring plate engage (again) on to the latching noses of the housing lower portion. Accordingly, actuation of the actuating knob permits a locking connection or an unlocking connection between the two housing portions.

The two housing portions however can also be simply brought together—without actuation of the actuating knob. In that case the latching arms of the spring plate firstly slide over the latching nose contour until finally the latching noses engage into the latching openings. That process is also referred to "plugging together" the housing halves.

In an advantageous embodiment of the invention the actuating knob is in the form of a combined rotary and press knob. The actuating knob is locked by a quarter-turn rotation in any direction. That means that it is no longer possible to press in (that is to say actuate) the actuating knob. It is only by rotation in the opposite direction that the actuating knob is unlocked again. That prevents inadvertent actuation of the actuating knob.

Advantageously there is provided a direction of rotation in the counter-clockwise direction, for locking the actuating knob.

Advantageously the surface of the actuating knob is roughened so that the actuating knob can be easily rotated with the thumb.

It may however also be advantageous if the actuating knob includes an orifice, into which a tool can be inserted, with which the rotary movement can be produced.

BRIEF DESCRIPTION OF THE DRAWINGS

An embodiment by way of example of the invention is described in greater detail hereinafter and illustrated in the drawings in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

Figure 1:
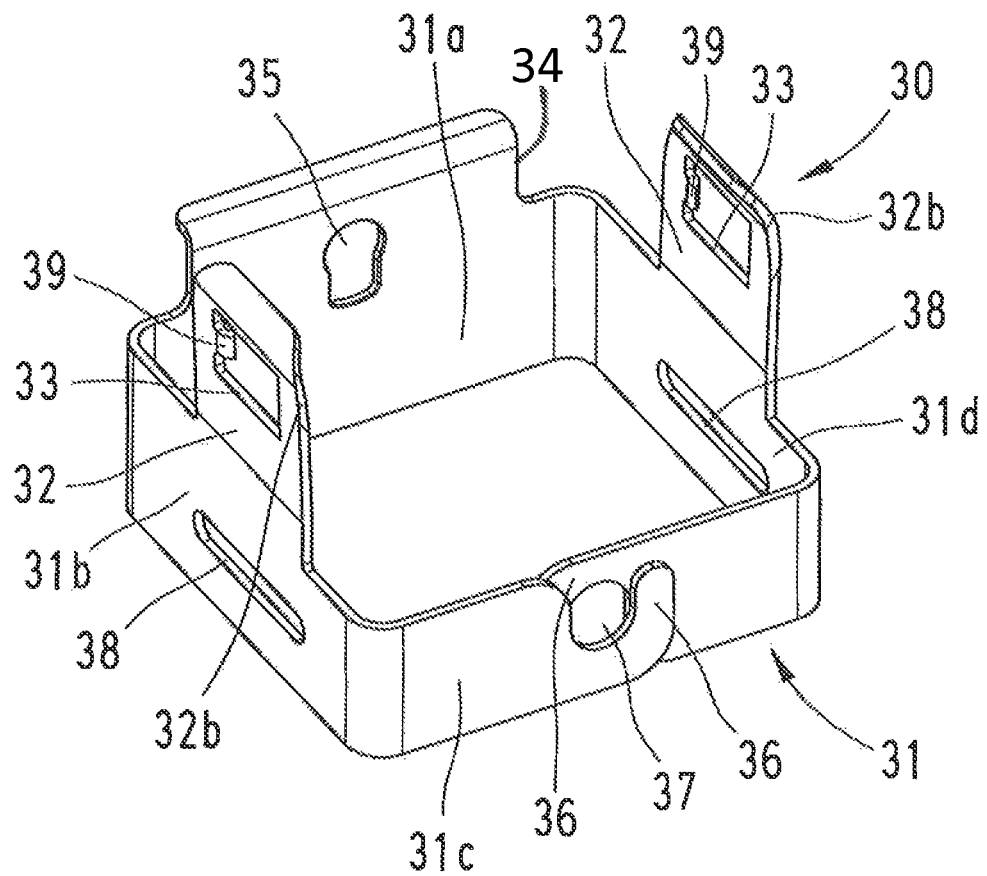
FIG. 1 shows a perspective view of a spring plate.

FIG. 1 shows a perspective view of a spring plate 30. The spring plate 30 is stamped out of one piece of sheet metal and is shaped by means of a bending process into a substantially rectangular, frame-shaped base structure 31. Projecting from that base structure 31 are two latching arms 32 which are mutually opposite and which are arranged in mutually parallel relationship.

The two latching arms 32 have a latching opening 33. A respective latching hook 39 is shaped within the openings 33. The latching hooks 39 are each bent slightly inwardly, that is to say towards each other.

A frame wall 31a has a raised portion 34 which at the end is bent outwardly. The frame wall 31a also includes a keyhole-shaped opening 35. The opposite frame wall 31c is formed from two parts which come together and whose hook-shaped ends 36 overlap in such a way that they enclose an opening 37 with each other.

The frame walls 31b and 31d each include a respective orifice 38. The orifice 38 represents a part of the fixing for the spring plate 30 in a housing upper portion 20 of a plug connector housing.

Figure 2:
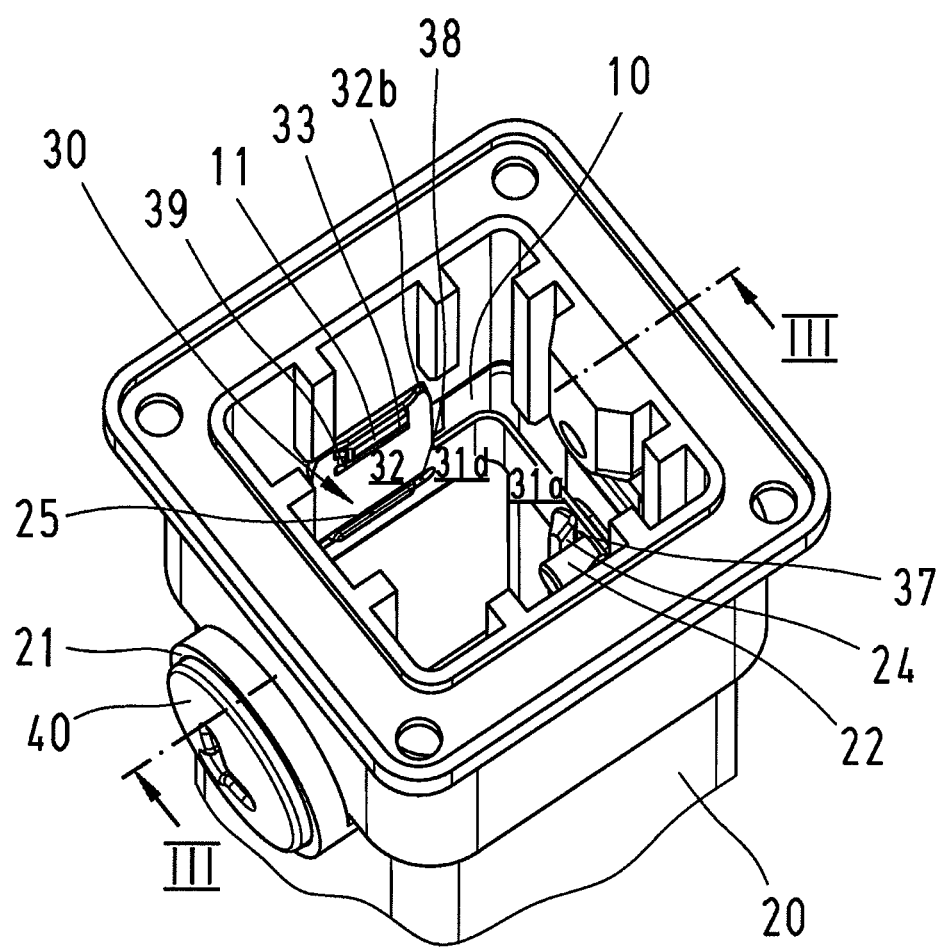
FIG. 2 shows a perspective view of a housing upper portion with integrated spring plate latched to a housing lower portion.

FIG. 2 shows a perspective view of the housing upper portion 20 which is latched to a housing lower portion 10. The spring plate 30 is clamped captively within the housing lower portion 20 in such a way as to be safeguarded against loss.

The housing upper portion 20 is of a substantially box-shaped configuration. Formed at two mutually opposite side walls of the housing upper portion 20 are legs 25 which engage into the orifices 38 in the spring plate 30. The orifices 38 are longer than the legs 25 so that the legs 25 have some clearance on both sides in the orifices 38 and thereby permit the application of force by the actuating knob to the spring plate.

The lower housing portion 10 latched to the housing upper portion 20 is also of a substantially box-shaped configuration. Two mutually opposite inside walls of the housing lower portion 10 include respective latching noses 11. The latching noses 11 engage into the openings 33 of the spring plate 30 so that the housing halves 10, 20 are captively connected together by way of the spring plate 30.

A housing wall of the housing upper portion 10 includes a bore, through which a pin 22 projects into the housing interior. The pin shank is enclosed by a fork-like structure 24 formed at the inside wall of the housing upper portion 20. The hook-shaped ends 36 of the spring plate 30, which enclose an opening 37 with each other, engage around the pin shank in the housing interior. The frame wall 31c of the spring plate 30 is disposed between the fork-like structure 21 and the housing inside wall.

The inside walls of the housing upper portion 20 which include the legs 25 and the inside walls of the housing lower portion 10 which include the latching noses 11 are aligned with each other when the housing halves 10, 20 are fitted on to each other.

Separation of the Housing Halves

Figure 3:
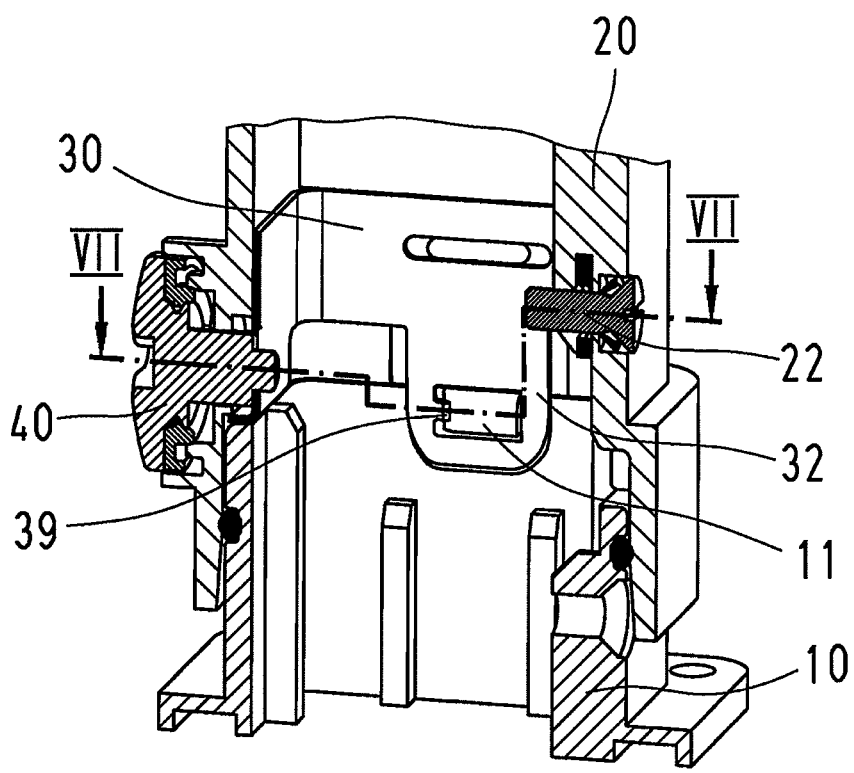
FIG. 3 shows a section III-III from FIG. 2 through two housing halves which are latched together.

FIG. 3 shows the section III-III of the latched housing halves 10, 20 of FIG. 2. When the actuating knob 40 is pressed in, in the direction of the housing interior, the latching arms 32 of the spring plate 30 are displaced along the inside walls of the housing lower portion 10 and the housing upper portion 20. As already mentioned hereinbefore the orifices 38 afford the play necessary for that. The latching hooks 39 of the latching openings 33 slide down on the latching noses 21 of the housing lower portion 10. As a result the latching arms 32 are bent towards each other so that the openings 33 in the latching arms 32 of the latching plate 30 are moved out of the condition of latching connection to the latching noses 11. The housing halves can now be separated from each other.

Locking of the Housing Halves

Figure 4:
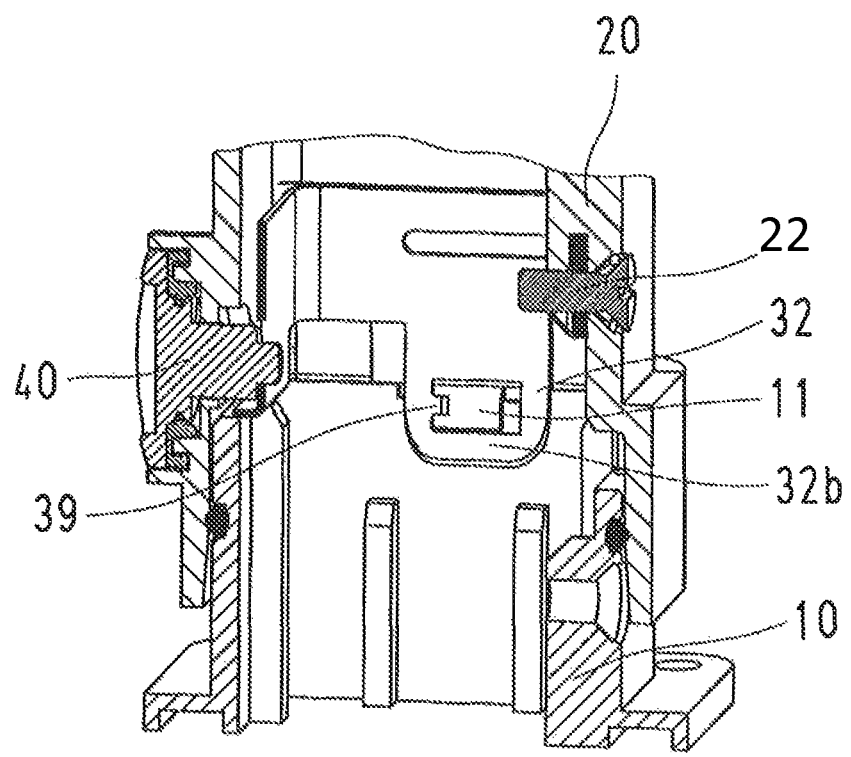
FIG. 4 shows the section III-III through the two housing halves which are still unlatched.

FIG. 4 also shows the section III-III. It will be noted however that the housing halves 10, 20 are here still unlocked. By way of its inwardly bent region 32b the latching arm 32 of the latching plate 30 is pushed in the locking process over the latching nose 11 of the lower housing half 10. In that case the latching arms 32 bend slightly inwardly towards each other. When the housing halves 10, 20 are brought further together the latching arms 32 snap back outwardly so that the openings 33 in the latching arms 32 engage over the latching noses 11. That provides that the two housing halves 10, 20 are captively connected.

It is to be noted that a cover for the housing upper portion 20, on which there is provided a so-called cable exit, is not shown in the Figures disclosed here, for the sake of clarity of the drawing.

Figure 5:
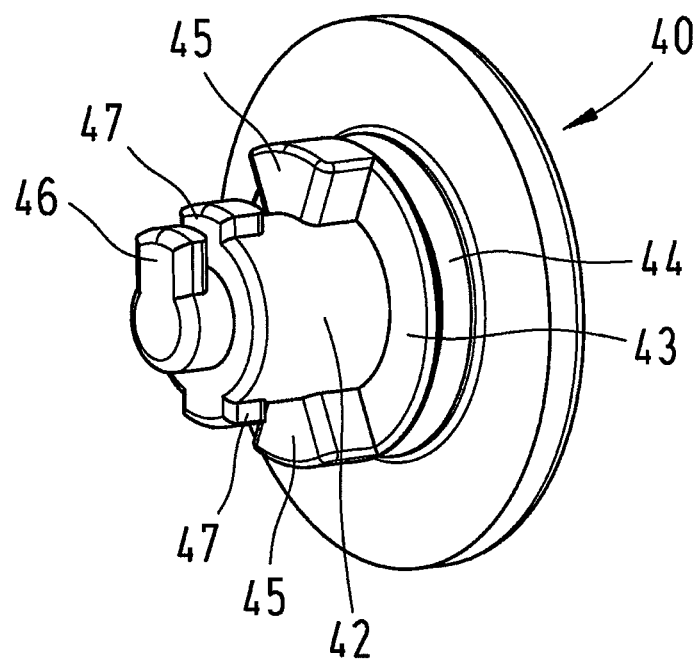
FIG. 5 shows a perspective rear view of an actuating knob.
Figure 6:
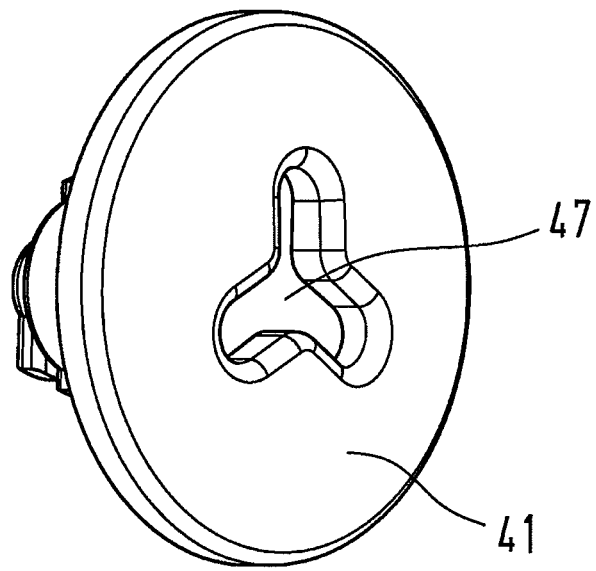
FIG. 6 shows a perspective front view of the actuating knob.

FIG. 5 shows a perspective rear view and FIG. 6 shows a perspective front view of the actuating knob 40. The actuating knob 40 substantially comprises a disk-shaped pressing surface 41. A cloverleaf-shaped recess 47 is provided in the surface 41 at the operating side. A suitable tool for radial rotary movement of the actuating knob 40 can be inserted into the recess 47.

Firstly a shoulder 43 with a peripherally extending groove 44 is formed on the rear side from the pressing surface 41. The shoulder 43 includes two raised locking structures 45 which enclose a cylindrical portion 42 shaped thereon, which extends perpendicularly from the shoulder 43 and which projects (in the assembled condition) into the interior of the housing upper portion 20. The locking structures 45 are approximately in the form of a truncated triangular pillar.

At the end the cylindrical portion 42 includes a locking hook 46. Further beneath that so-called toggles 47 are provided on both sides on the cylindrical portion 42.

Figure 7:
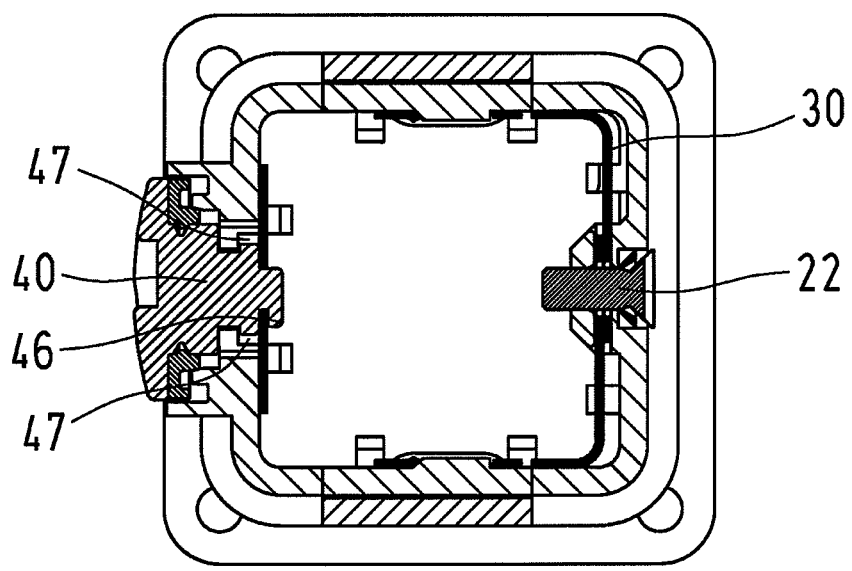
FIG. 7 shows a section VII-VII through the housing portions of FIG. 3, which are locked together.

FIG. 7 shows a section VII-VII from FIG. 3 of the housing portions which are locked together. The cylindrical portion 42 of the actuating knob 40 projects into the interior of the locked plug connector housing.

The locking hook 46 on the cylindrical portion 42 also passes in this case through the keyhole-shaped opening 35 in the frame wall 31a of the spring plate 30 which is latched in the housing upper portion 20. The toggles 47 of the shaped portion 42 remain on the other side of the frame wall 31a. The spring plate 30 is arranged in that region between locking hook 46 and toggle 47.

When the actuating knob 40 is pressed in a force is exerted on the spring plate 30 by way of the toggles 47. As already described above as a result the openings 33 of the latching arms 32 of the spring plate 30 slide beyond the latching noses 11 of the housing lower portion 10.

Figure 8:
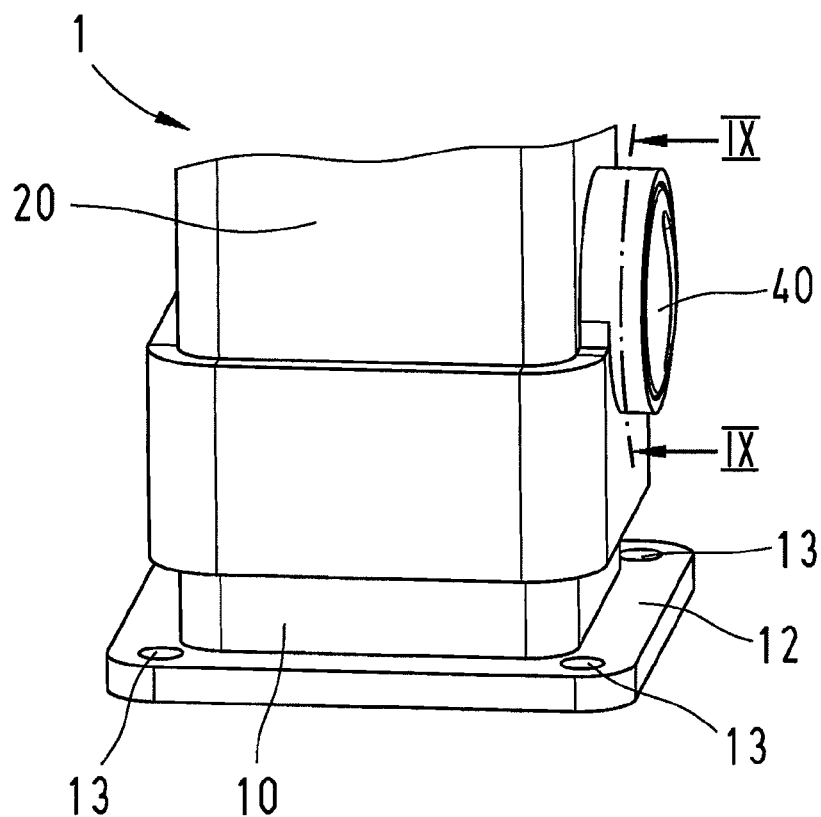
FIG. 8 shows a perspective side view of the housing portions which are latched together.
Figure 9:
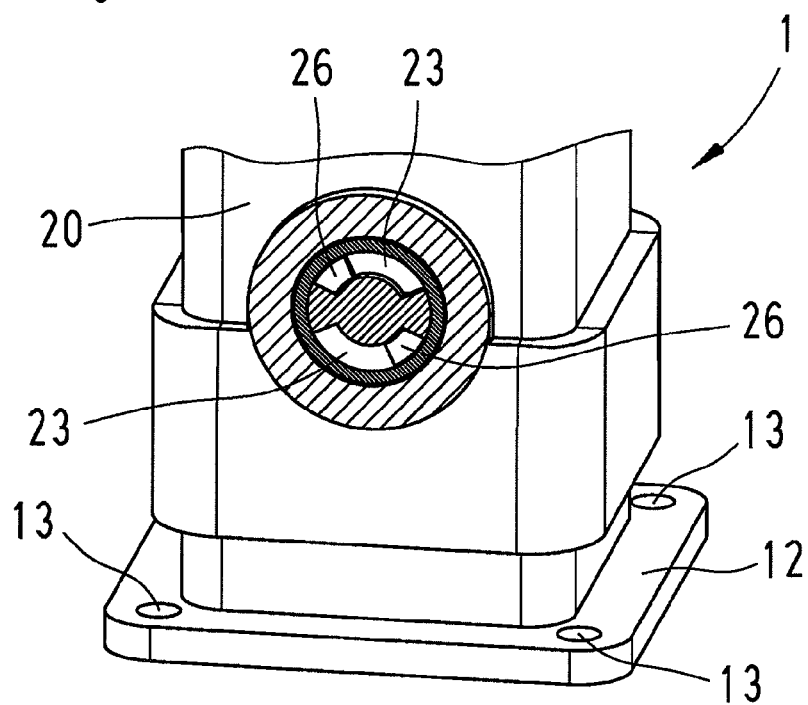
FIG. 9 shows a section IX-IX from FIG. 8.

FIG. 8 shows a perspective side view of the housing portions 10, 20 which are latched together. FIG. 9 shows the section IX-IX from FIG. 8. It is also possible to see two abutments 26 which are formed along the circular orifice 21 in the housing upper portion 20. It is also possible to see through the orifice 21 blade portions 23 which are disposed further within the housing upper portion 20 than the abutments 26. The function of the abutments 26 and the blade portions 23 is described hereinafter. In the assembled condition the locking structures 45 of the actuating knob 40 are disposed in a common plane with the abutments 26 of the circular orifice 21 of the housing upper portion 20.

As already mentioned hereinbefore the actuating knob 40 can be locked to prevent inadvertent actuation. In the unlocked condition the locking structures 45 of the actuating knob 40 are disposed jointly in a plane which is oriented parallel to the base surface 12 of the housing lower portion 10.

Upon a radial rotation of the actuating knob 40 through about 90° in the counter-clockwise direction the locking structures 45 of the actuating knob 40 are moved against the abutments 26 of the orifice 21 of the housing upper portion 20. The plane of the locking structures 45 is now at an approximately right angle to the plane of the base surface 12. The blade portions 23 prevent the actuating knob 40 from being pressed in (actuated) as the locking structures 45 of the actuating knob 40 now bear against the blade portions 23.

Locking of the actuating knob 40 is released again by a radial rotary movement of the actuating knob 40 in the opposite direction.

For further details of the locking function of the actuating knob attention is directed here to EP 2 194 217 A1.

The housing lower portion 10 includes bores 13 which make it possible for the housing lower portion 10 to be mounted for example to a machine wall.

LIST OF REFERENCES

Locking Device for a Plug-In Connector Housing

| | |
|---|---|
| 1 | plug connector housing |
| 10 | housing lower portion |
| 11 | latching noses |
| 12 | base surface |
| 13 | bores |
| 20 | housing upper portion |
| 21 | circular orifice |
| 22 | pin |
| 23 | blade portion |
| 24 | fork-like structure |
| 25 | leg |
| 26 | abutment |
| 30 | spring plate |
| 31 | frame-shape base structure |
| 31a-d | frame wall |
| 32 | latching arm |
| 32b | bent region of the latching arm |
| 33 | latching opening |
| 34 | raised portion |
| 35 | keyhole-shaped opening |
| 36 | hook-shaped end |
| 37 | opening |
| 38 | orifices |
| 39 | latching hook |
| 40 | actuating knob |
| 41 | pressing surface |
| 42 | cylindrical portion |
| 43 | shoulder |
| 44 | groove |
| 45 | locking structure |
| 46 | locking hook |
| 47 | toggle |

The invention claimed is:

1. A multi-part plug connector housing comprising a housing first portion and a housing second portion fitting thereto and a locking device for locking the housing first portion to the housing second portion,
   wherein the locking device comprises a spring plate and a single, outwardly disposed actuating knob,
   wherein the housing first portion and the housing second portion can be reversibly mechanically connected together by way of the spring plate for locking the housing first portion to the housing second portion,
   wherein the spring plate is arranged in an interior of the housing first portion and the housing second portion,
   wherein said housing first portion has a substantially box-shape with four walls substantially orthogonal to each other, one wall including an opening for rotatably and slidably receiving said actuating knob,
   wherein said housing second portion has a substantially box-shape with four walls substantially orthogonal to each other, wherein two opposing walls of the four walls include latching noses that extend toward the interior of the housing second portion,
   wherein said spring plate is formed into a substantially rectangular frame-shaped base structure having four walls substantially orthogonal to each other and two opposing parallel latching arms that project from said base structure in a direction towards the interior of the housing second portion, each latching arm including a latch opening sized to receive and engage with a corresponding one of the latching noses of the housing second portion, each of said latching arms includes a latching hook that extends into the latching opening and towards the interior of the housing second portion so as to be engaged by a corresponding one of the said latching noses, wherein the spring plate is operatively connected to the actuating knob, said actuating knob extending from an exterior to the interior of the housing first and second portions, wherein the actuating knob is movable inwardly towards the interior of the housing first and second portions to transmit a force to the spring plate to displace the spring plate such that the latching hooks slide down the latching noses to disengage the latching openings from the latching noses, causing the housing first portion to be unlocked from the housing second portion.

2. A multi-part plug connector housing as set forth in claim 1 wherein the spring plate is clamped in the interior of the housing first portion in such a way as to be safeguarded against loss.

3. A multi-part plug connector housing as set forth in claim 1 wherein the actuating knob is in the form of a combined rotary and press knob.

4. The multipart plug connector housing of claim 3 wherein said actuating knob is rotatable to lock the actuating knob from moving inwardly to prevent displacement of the spring plate.

5. The multipart plug connector housing of claim 1 wherein said housing first portion further includes a wall adjacent to said one wall having an elongated leg for guiding the displacement of the spring plate, and said spring plate base structure includes an elongated orifice for receiving said leg, said orifice having a length longer than said leg to enable the spring plate to be displaced by the inward movement of the actuating knob.

* * * * *